(12) United States Patent
Chae et al.

(10) Patent No.: US 10,560,935 B2
(45) Date of Patent: Feb. 11, 2020

(54) METHOD AND DEVICE FOR TRANSMITTING AND RECEIVING SIGNAL IN WIRELESS COMMUNICATION SYSTEM

(71) Applicant: LG ELECTRONICS INC., Seoul (KR)

(72) Inventors: Hyukjin Chae, Seoul (KR); Kwangseok Noh, Seoul (KR); Dongkyu Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/563,845

(22) PCT Filed: Apr. 4, 2016

(86) PCT No.: PCT/KR2016/003461
§ 371 (c)(1),
(2) Date: Oct. 2, 2017

(87) PCT Pub. No.: WO2016/159738
PCT Pub. Date: Oct. 6, 2016

(65) Prior Publication Data
US 2018/0098321 A1 Apr. 5, 2018

Related U.S. Application Data

(60) Provisional application No. 62/142,493, filed on Apr. 3, 2015, provisional application No. 62/170,117, filed on Jun. 2, 2015.

(51) Int. Cl.
*H04W 72/04* (2009.01)
*H04L 5/00* (2006.01)
*H04W 72/08* (2009.01)

(52) U.S. Cl.
CPC ......... *H04W 72/0446* (2013.01); *H04L 5/001* (2013.01); *H04L 5/0053* (2013.01); *H04W 72/0453* (2013.01); *H04W 72/082* (2013.01)

(58) Field of Classification Search
CPC ............ H04W 72/0446; H04W 84/00; H04W 56/0015; H04W 72/082; H04W 72/0453;
(Continued)

(56) References Cited

U.S. PATENT DOCUMENTS 9,775,151 B2 * 9/2017 Jung ..................... H04L 5/0064
9,918,290 B2 * 3/2018 Li ......................... H04W 76/14
(Continued)

FOREIGN PATENT DOCUMENTS

KR 10-2013-0038804 A 4/2013
KR 10-2014-0010383 A 1/2014
(Continued)

*Primary Examiner* — Brian T O Connor
(74) *Attorney, Agent, or Firm* — Birch, Stewart, Kolasch & Birch, LLP

(57) ABSTRACT

According to one embodiment of the present invention, a method by which a first device transmits and receives a signal in a wireless communication system comprises the steps of: transmitting system information; and transmitting a downlink signal in a predetermined subframe on the basis of the system information, wherein, when the predetermined subframe is indicated as a subframe for an uplink transmission in the system information, the first device transmits, to a second device, information indicating that a frequency shift has been applied and/or information indicating that a time shift has been applied.

15 Claims, 11 Drawing Sheets

(58) Field of Classification Search
CPC ........ H04L 5/0053; H04L 5/001; H04J 11/00; H04B 7/26; H04B 7/2656
See application file for complete search history.

(56) References Cited

U.S. PATENT DOCUMENTS

| | | | |
|---|---|---|---|
| 10,051,580 B2* | 8/2018 | Kim | H04W 52/04 |
| 10,075,263 B2* | 9/2018 | Kusashima | H04W 72/04 |
| 10,122,488 B2* | 11/2018 | Chung | H04H 20/38 |
| 2012/0039268 A1* | 2/2012 | Hakkinen | H04L 5/001 |
| | | | 370/329 |
| 2012/0122440 A1* | 5/2012 | Krishnamurthy | H04L 5/0053 |
| | | | 455/418 |
| 2017/0070985 A1* | 3/2017 | Uchino | H04W 56/00 |
| 2017/0346685 A1* | 11/2017 | Wang | H04L 5/001 |
| 2018/0007681 A1* | 1/2018 | Yang | H04L 1/18 |
| 2018/0077659 A9* | 3/2018 | Li | H04W 76/14 |
| 2018/0152900 A1* | 5/2018 | Park | H04W 52/325 |
| 2018/0152916 A9* | 5/2018 | Nigam | H04W 72/042 |

FOREIGN PATENT DOCUMENTS

| | | |
|---|---|---|
| KR | 10-2014-0142238 A | 12/2014 |
| WO | WO 2014/107063 A1 | 7/2014 |
| WO | WO 2014/157786 A1 | 10/2014 |

\* cited by examiner (a)

(b)

(a)

(b)

METHOD AND DEVICE FOR TRANSMITTING AND RECEIVING SIGNAL IN WIRELESS COMMUNICATION SYSTEM

CROSS REFERENCE TO RELATED APPLICATIONS

This application is the National Phase of PCT International Application No. PCT/KR2016/003461, filed on Apr. 4, 2016, which claims priority under 35 U.S.C. 119(e) to U.S. Provisional Application No. 62/142,493, filed on Apr. 3, 2015 and 62/170,117 filed on Jun. 2, 2015, all of which are hereby expressly incorporated by reference into the present application.

TECHNICAL FIELD

Following description relates to a wireless communication system, and more particularly, to a method of transmitting and receiving a signal in full duplex or (TDD/FDD) eIMTA (enhanced interference management and traffic adaptation) and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

DISCLOSURE OF THE INVENTION

Technical Task

A technical task of the present invention is to provide a method of transmitting and receiving a signal capable of cancelling interference in (in-band) full duplex or (TDD/FDD) eIMTA.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting and receiving a signal, which is transmitted and received by a first device in a wireless communication system, includes the steps of transmitting system information and transmitting a downlink signal in a prescribed subframe based on the system information. In this case, if the system information indicates the prescribed subframe as a subframe for uplink transmission, the first device can transmit at least one of information indicating that a frequency shift is applied and information indicating that a time shift is applied to a second device.

To further achieve these and other advantages and in accordance with the purpose of the present invention, according to a different embodiment, a first device transmitting and receiving a signal in a wireless communication system includes a transmitter and a receiver, and a processor, the processor configured to transmit system information, the processor configured to transmit a downlink signal in a prescribed subframe based on the system information. In this case, if the system information indicates the prescribed subframe as a subframe for uplink transmission, the first device can transmit at least one of information indicating that a frequency shift is applied and information indicating that a time shift is applied to a second device.

The frequency shift and the time shift can be applied at the same time when the prescribed subframe is transmitted.

The application of the frequency shift is to transmit the prescribed subframe by tuning an oscillator on the basis of an uplink transmission CFO (carrier frequency offset).

The application of the time shift is to use a time offset used for uplink transmission for transmission of the prescribed subframe.

A time offset used for uplink transmission may correspond to 624 Ts.

The prescribed subframe can be excluded from targets to which power control is applied.

The first device may correspond to an eNB and the second device may correspond to a cell adjacent to the first device or a UE belonging to the cell adjacent to the first device.

The downlink signal can be used for cancelling interference to receive an uplink signal of the second device.

Advantageous Effects

According to the present invention, it is able to cancel interference capable of being occurred in transmitting and receiving a signal in (in-band) full duplex environment or (TDD/FDD) eIMTA environment.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incor

BEST MODE

Mode for Invention

Figure 1:
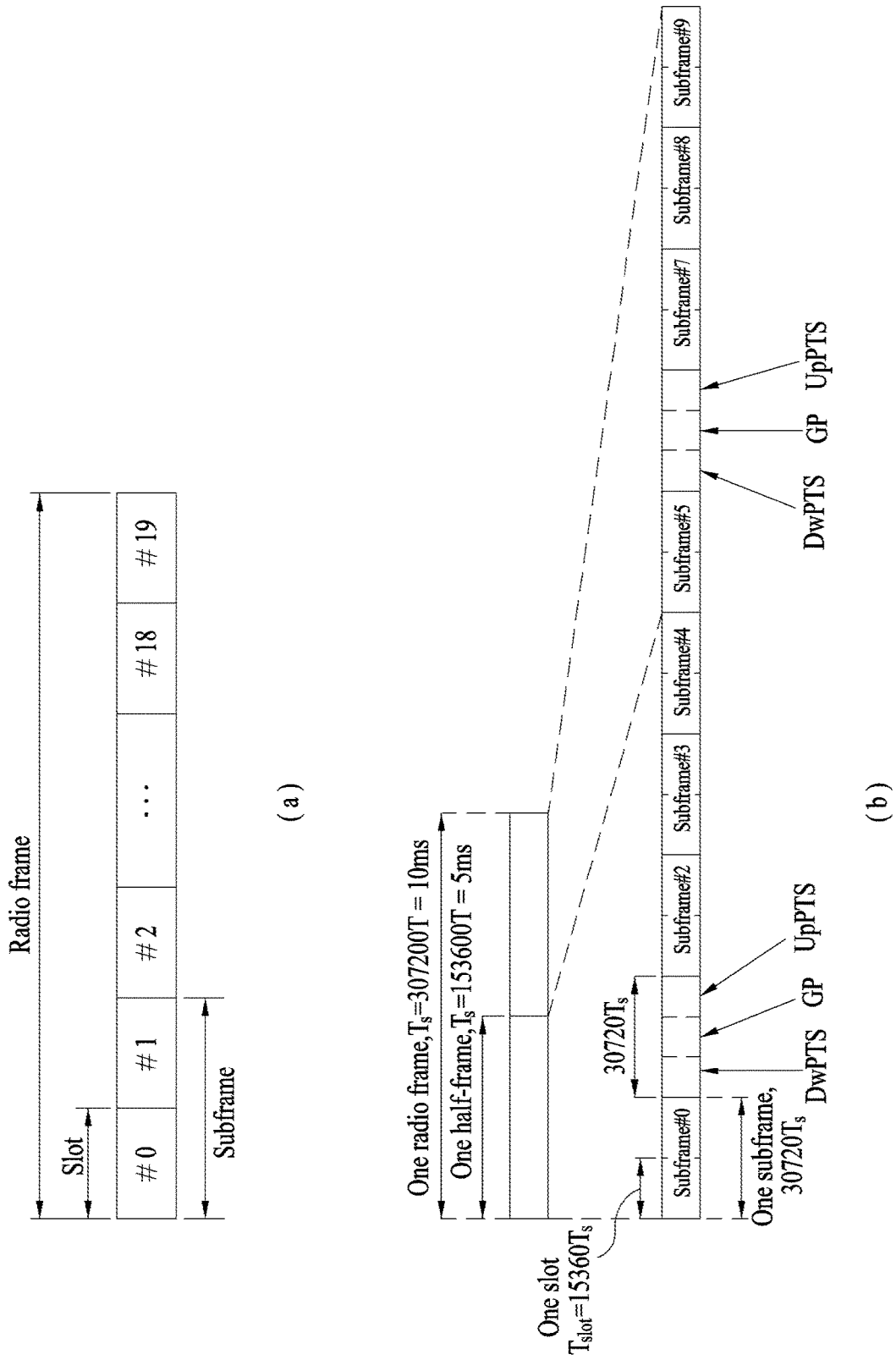
- FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
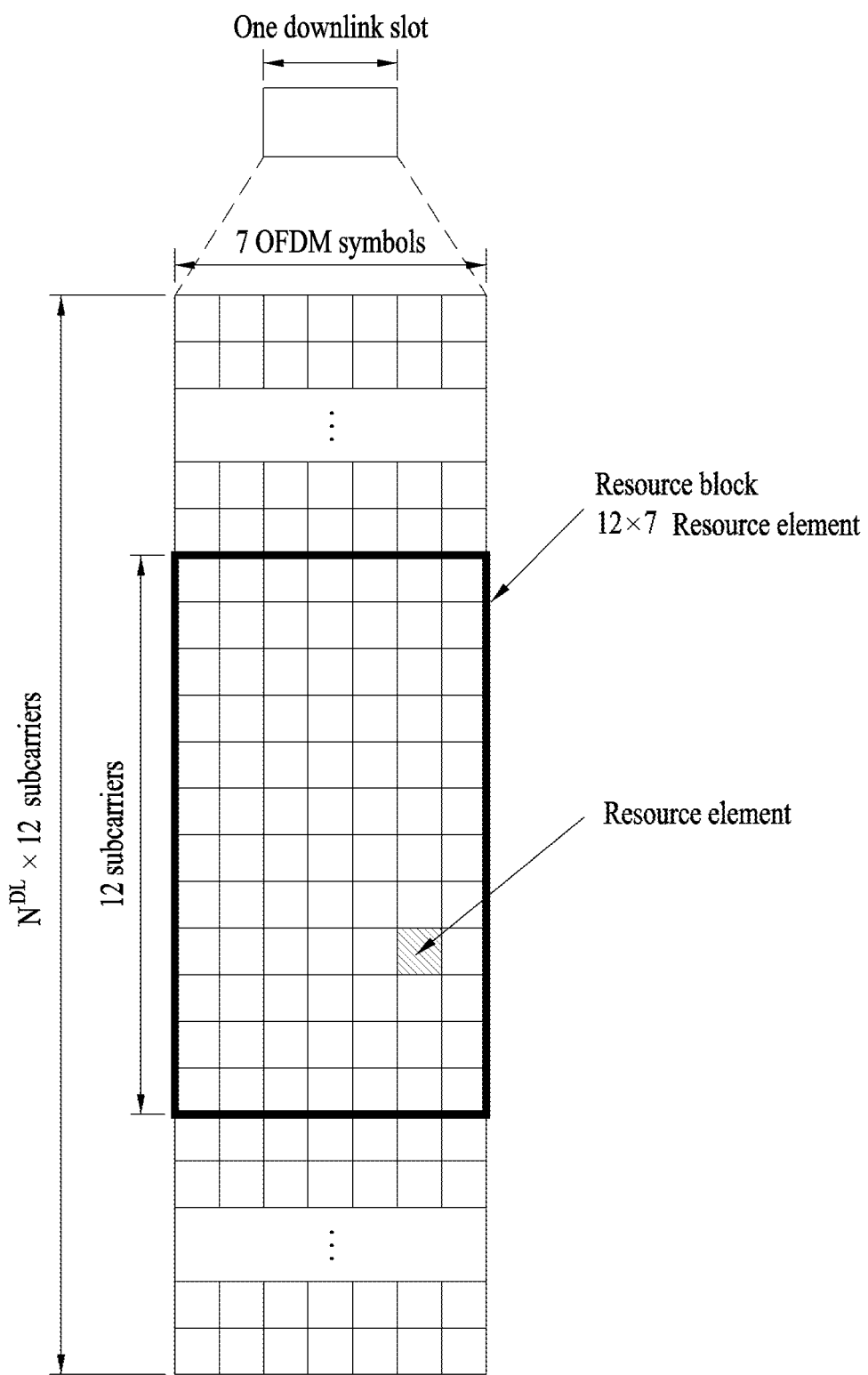
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
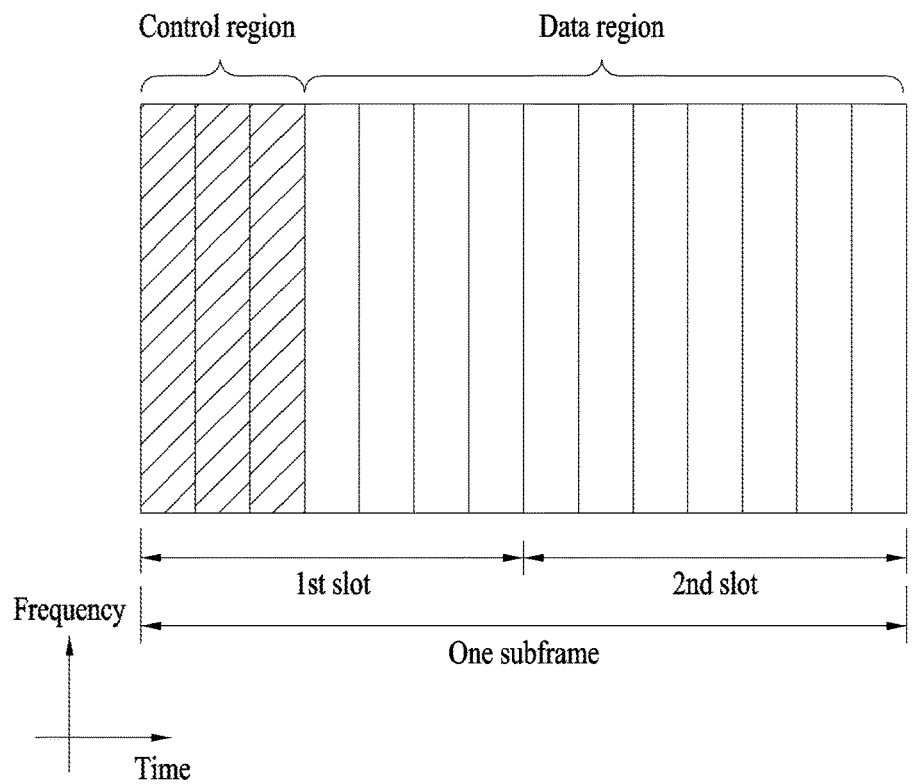
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
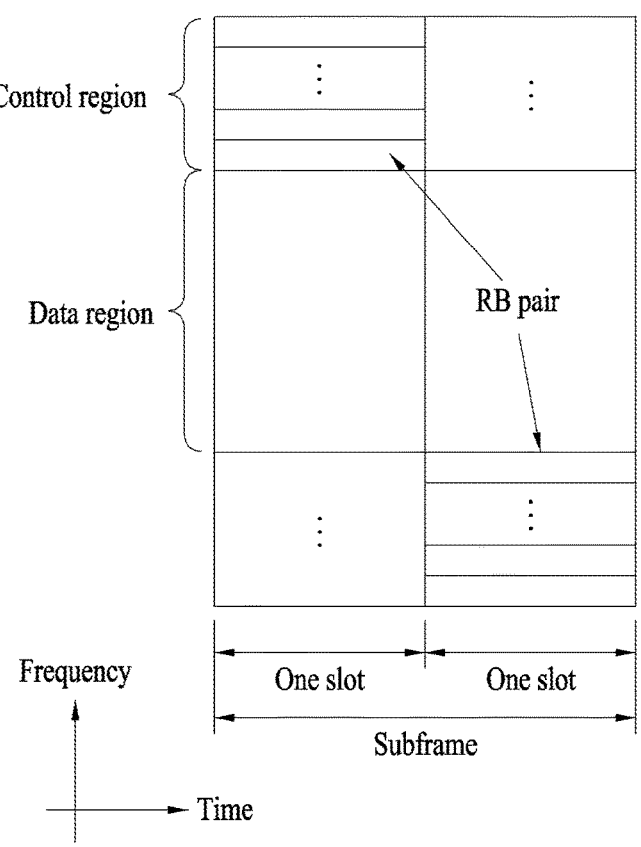
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
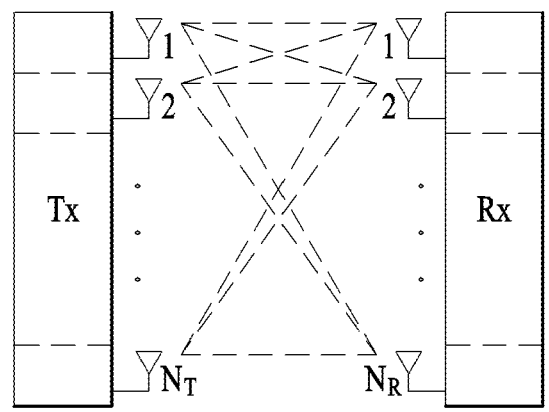
FIG. 5 is a diagram for a configuration of a wireless communication system having multiple antennas.
Figure 5:
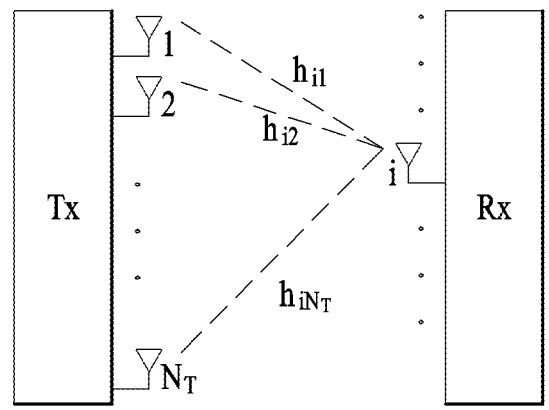

FIG. 5 is a diagram illustrating a configuration of a wireless communication system having multiple antennas.

As shown in FIG. 5(*a*), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_j \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
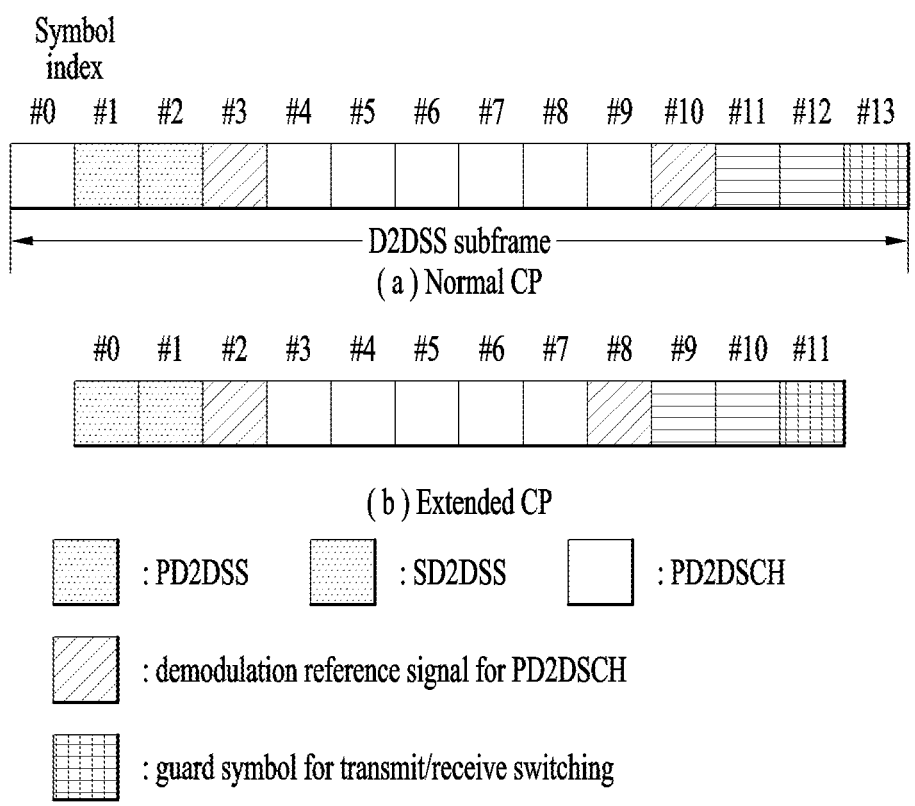
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
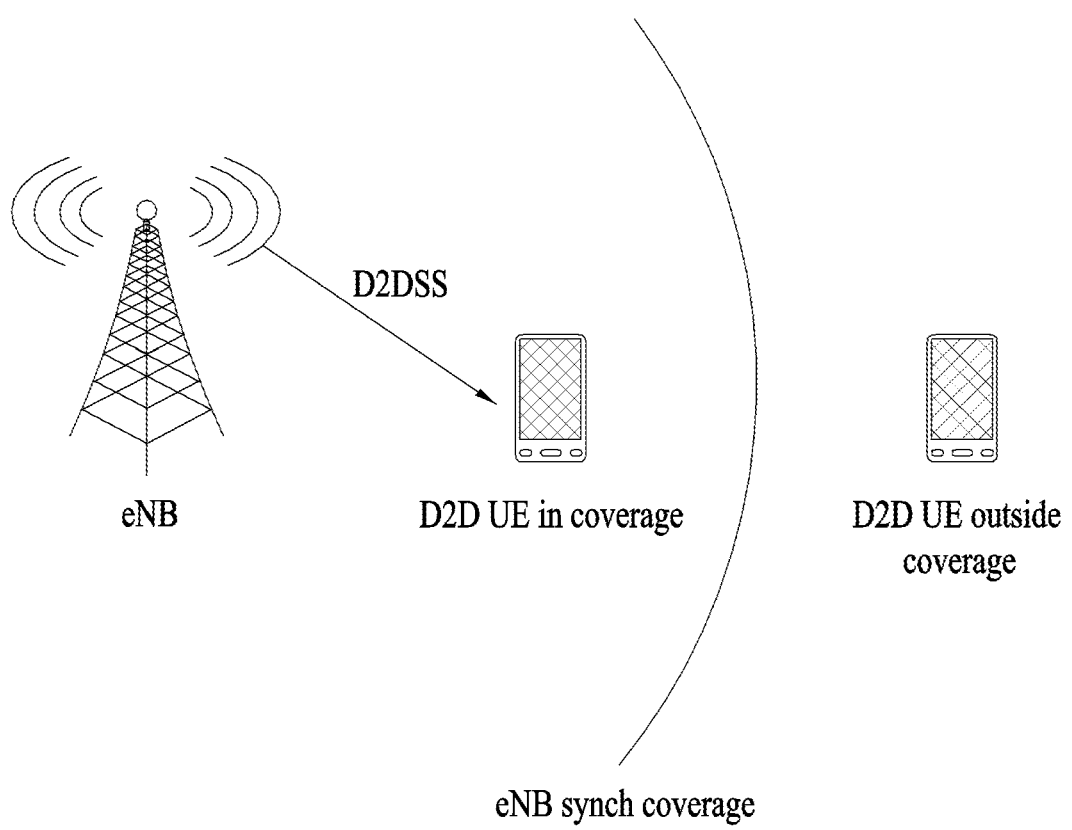
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
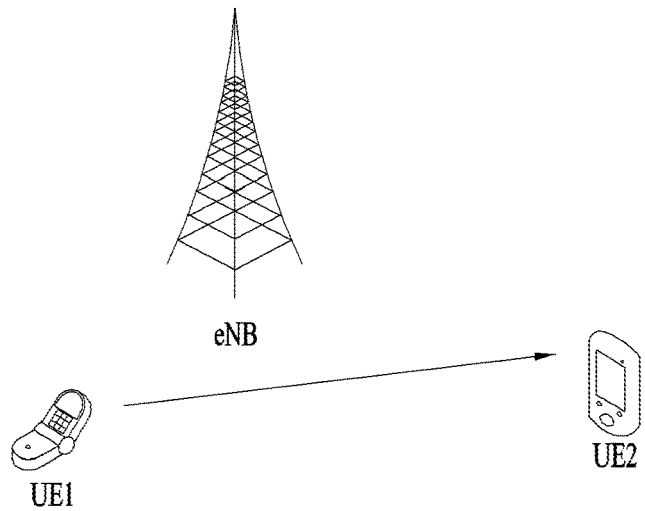
FIG. 8 is a diagram for an example of a D2D resource pool for performing D2D communication.
Figure 8:
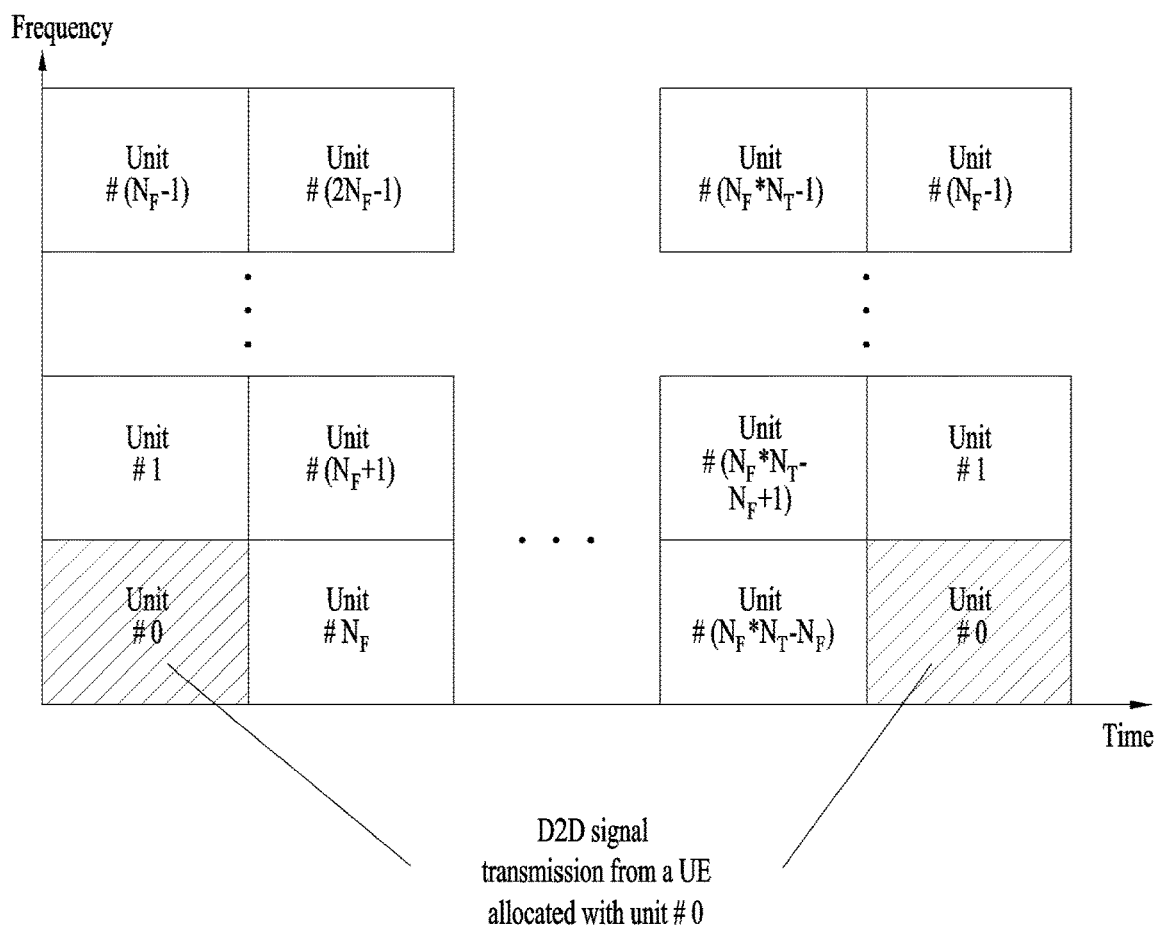

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
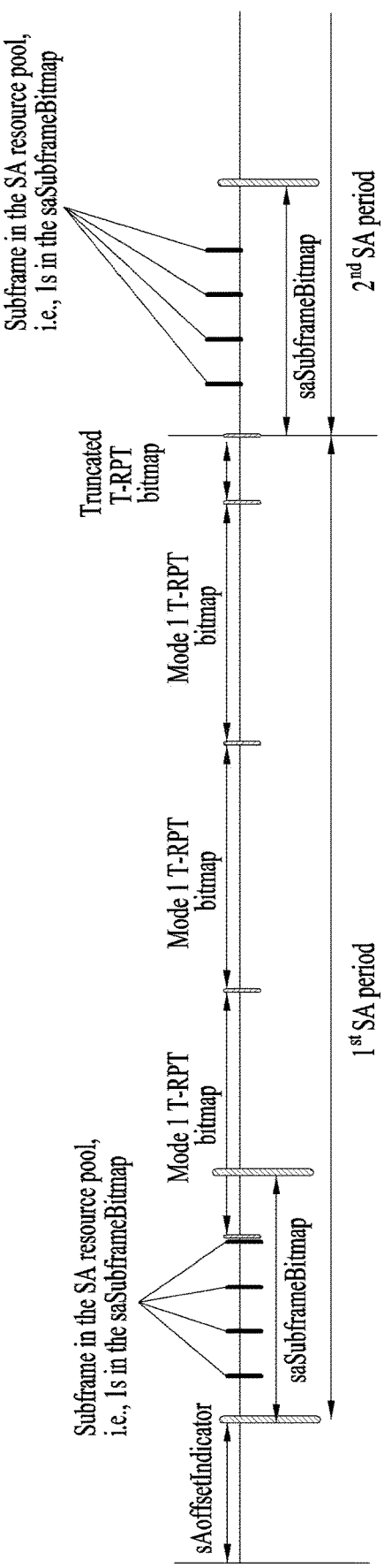
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

Switching UL Subframe with DL Subframe (Enhanced Interference Management and Traffic Adaptation, eIMTA)

In case of TDD, each of subframes (except a special subframe for switching between UL and DL) is configured to be used for either UL or DL in advance. Specifically, referring to Table 1 in the following, in case of uplink-downlink configuration 0, subframes 0 and 5 are configured to be used for DL and subframes 2, 3, 4, 7, 8, and 9 are configured to be used for UL in a radio frame in advance. A UL-DL configuration to be used by a specific eNB can be provided to a terminal as a part of system information (e.g., SIB 1). It may be able to forcibly configure adjacent eNBs to use the same TDD configuration, i.e., UL-DL configuration, due to such a reason as interference and the like.

TABLE 1

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(D: subframes for DL transmission, U: subframes for UL transmission, S: special subframes)

When a system is managed according to the UL-DL configuration shown in Table 1, if an amount of data transmitted in UL or DL is rapidly increased in each cell, it may use one or more subframes configured as UL by changing the subframes into subframes configured as DL to smoothly transmit the data. Or, it may use one or more subframes configured as DL by changing/switching the subframes into subframes configured as UL to smoothly transmit the data. By doing so, it may be able to increase efficiency.

When a UL subframe is switched to a DL subframe, it can be performed in subframes represented by bolded letters in Table 2 in the following. Yet, Table 2 shows a case that a change of a switching period is permitted. If the change of the switching period is not permitted, subframes capable of being used by switching to DL are represented by bolded letters in Table 2.

It may be able to configure that a UL subframe is switched to a DL subframe only when a legacy TDD configuration is satisfied. In other word, when a usage of a subframe is dynamically switched, it may indicate that a TDD UL-DL configuration after the switching should be one of the configurations of Table 1. Specifically, if a $4^{th}$ subframe is switched to a DL subframe in UL-DL configuration 0, it may indicate that a $9^{th}$ subframe should also be switched to a DL subframe at the same time. In this case, whether or not a UL-DL configuration is changed can be indicated by 1 bit.

Recently, discussion on a method of using a UL band as DL by changing the UL band into DL is in progress in FDD system. The method of using the UL band as DL by dynamically changing the UL band into DL can be referred to as FDD eIMTA or flexible duplex.

Embodiment

In the following, a method of transmitting and receiving a signal according to embodiments of the present invention is explained. In the following description, a first device may correspond to an eNB and a second device may correspond to an eNB or a D2D reception UE. A third device may correspond to a UE performing UL transmission with an eNB or a UE transmitting a signal to a D2D UE.

Figure 10:
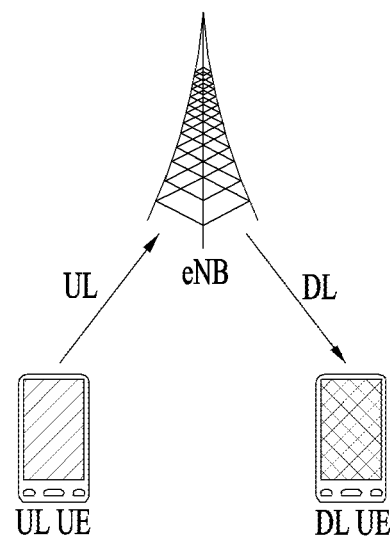
FIGS. 10 to 12 are diagram for explaining embodiments of the present invention.
Figure 11:
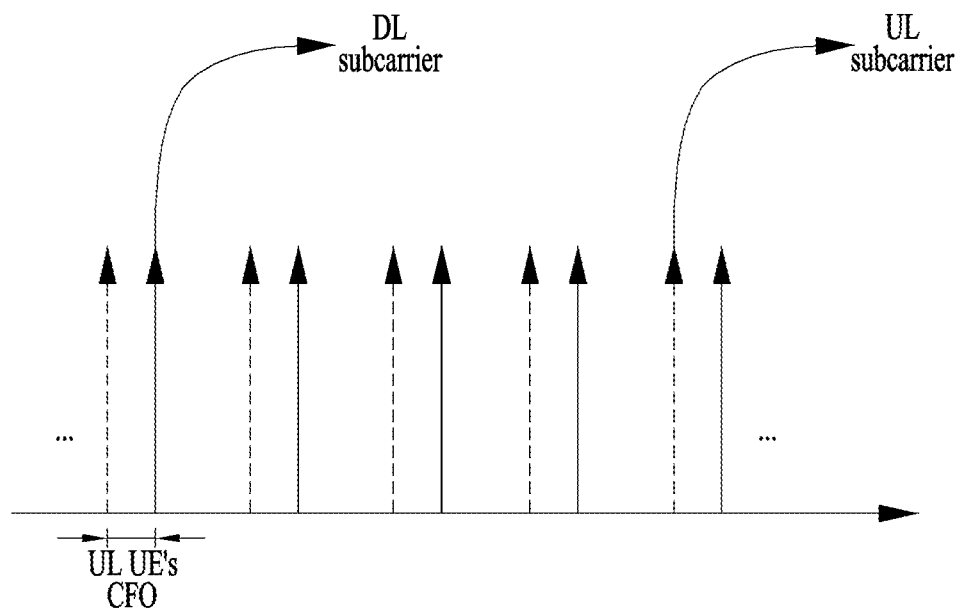

The embodiments of the present invention described in the following can be mainly applied to two cases. A first case corresponds to a case of (in-band) full duplex. For example, referring to FIG. 10, an eNB may operate in (in-band) full duplex. In particular, the eNB can perform DL transmission to a DL UE while receiving UL transmission from a UL UE. In this case, a different CFO (carrier frequency offset) may exist on a subcarrier where UL and DL are the same. For example, as shown in FIG. 11, when a CFO of DL corresponds to 0 Hz and a CFO of UL corresponds to 100 Hz, in order to cancel self-interference (or, in order to estimate a self-interference channel), it may transmit the DL in accordance with the 100 Hz CFO. If the CFO of DL is not matched with the CFO of UL, it is very difficult to cancel the

TABLE 2

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 3

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | self-interference. More specifically, in order to cancel the self-interference, it is necessary to perform estimation on a self-interference channel. Yet, since the CFO of UL is different from the CFO of DL, it is necessary for a receiver of an eNB to correct a UL frequency offset. When the correction is performed, since distortion occurs on a DL signal, channel estimation performance and self-interference cancellation performance are degraded (especially in frequency domain).

Figure 12:
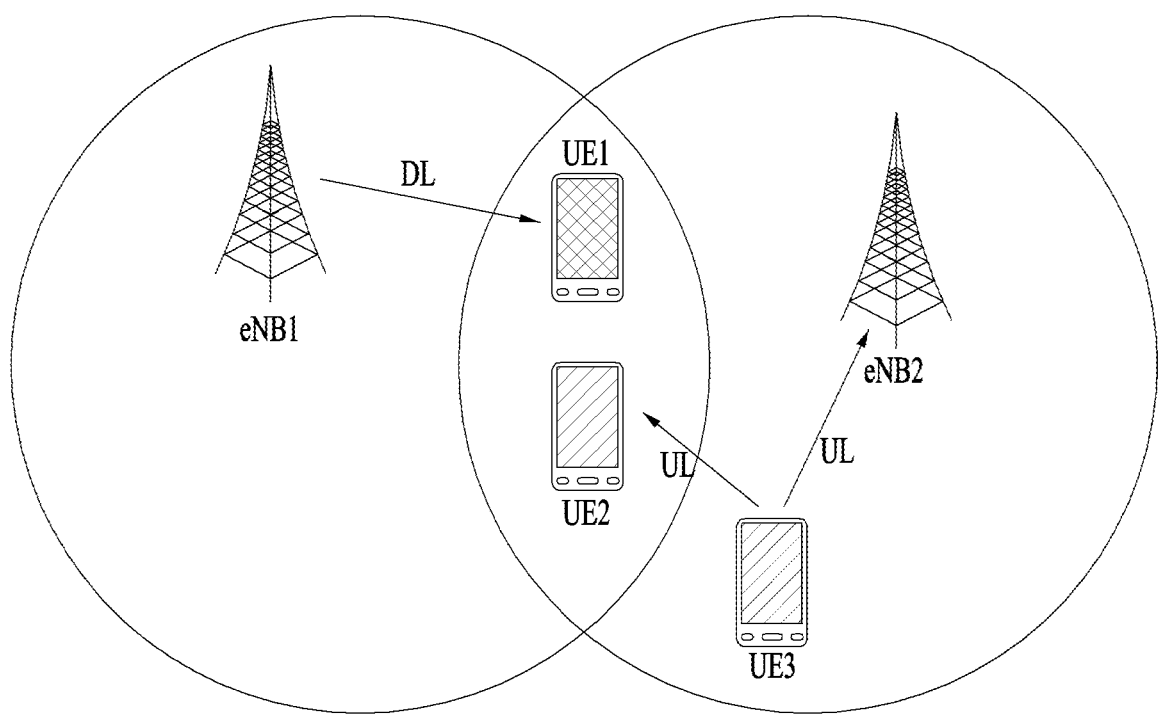

Following description can also be applied to a case of (TDD/FDD) eIMTA. Referring to FIG. 12, a first device (eNB1) can transceive a signal with a second device (eNB2 or UE2) in TDD. In this case, if the first device uses one of UL subframes for DL transmission, it may be difficult for the second device of an adjacent cell to perform interference cancellation when the second device performs UL reception. Specifically, similar to the aforementioned (in-band) full duplex, interference cancellation performance can be degraded due to the CFO difference between UL and DL. Since 624 Ts time offset is placed on a DL subframe adjacent to UL for Tx/Rx circuit switching, compared to the DL subframe, the UL subframe may operate in a manner of being pushed forward. Hence, it may be difficult to perform interference cancellation.

In order to solve the abovementioned problem, when the first device transmits system information and transmits a DL signal based on the system information in a prescribed subframe, if the system information indicates the prescribed subframe as a subframe for transmitting UL (i.e., although the prescribed subframe originally corresponds to a UL subframe, if the prescribed subframe is changed to a subframe for performing DL transmission for a certain purpose), the first device can transmit at least one of information indicating that frequency shift (frequency axis shift) has been applied and information indicating that time shift (time axis shift) has been applied to the second device. In this case, the frequency shift and the time shift can be applied at the same time when the prescribed subframe is transmitted. The application of the frequency shift may correspond to transmission of the prescribed subframe by tuning an oscillator on the basis of an UL transmission CFO (carrier frequency offset). The application of the time shift may correspond to using a time offset, which is used for performing UL transmission, for transmitting the prescribed subframe as well. The time offset used for performing the UL transmission may correspond to 624 Ts. LTE system assumes that time necessary for performing transmission/reception circuit switching corresponds to 624 Ts. Yet, if a different system assumes a circuit switching offset of a different size, a corresponding value may correspond to an offset value applied to a subframe of which a usage of the subframe is changed. In particular, when a subframe is originally configured as a UL subframe, if DL transmission is performed in the subframe, the DL transmission is performed by applying a time offset to the subframe.

In particular, when the first device uses a UL subframe as a DL subframe by changing a usage of the UL subframe, the first device applies frequency shift and time shift to the subframe and informs the second device of information on the usage change. The first device can directly inform the second device of the information via physical layer signaling or higher layer signaling. Or, an eNB may signal the information to the first device and the second device via physical layer signaling or higher layer signaling. In this case, the frequency shift is to perform UL transmission by correcting the UL transmission in accordance with DL CFO. The time shift is to perform transmission in advance as much as 624 Ts to correspond to the UL transmission of the second device located at a neighboring cell. In particular, when a UL subframe is used by changing a usage of the UL subframe (or when the UL subframe operates as a FDR subframe), UL/DL boundaries are aligned by putting 624 Ts offset on DL transmission timing. Specifically, in a cellular system, a timing advance is applied to a UL subframe to compensate propagation delay between an eNB and a UE. In case of TDD, in order to guarantee a TX/RX switching period between DL and UL, it may use a final timing advance value resulted from adding a prescribed offset (e.g., 624 Ts) to a timing advance value, which is indicated by an eNB to compensate propagation delay. As a result, although propagation delay between a specific UE and an eNB corresponds to 0, a UL frame may start with a timing advance as much as an offset. In this case, according to the present invention, when a UL subframe is changed to a FDR subframe, if the same offset is applied to a DL subframe as well, a boundary of the UL subframe can be matched with a boundary of the DL subframe. According to an operation of a legacy LTE TDD, a special subframe for TX/RX switching is included between a DL subframe and a UL subframe. In this case, if FDR or flexible duplex is applied, it may be able to perform a reception operation of a UE under the assumption that a DL subframe, which is received after the special subframe, starts earlier than a DL subframe, which is received prior to the special subframe, as much as the offset.

In other word, the reception operation of the UE is matched with UL transmission of a neighboring cell on both a time axis and a frequency axis. In this case, the second device can properly receive a UL signal transmitted by a third device (UE3) or a D2D signal transmitted in UL through an interference cancellation scheme. In particular, a DL signal transmitted by the first device can be used for cancelling interference to receive an UL signal of the second device. If DL signal transmission is matched with UL signal transmission, it is more efficient compared to an opposite case. This is because, if a frequency offset is intentionally put on a DL signal, channel estimation and detection performance of DL UEs can be degraded.

In addition to the interference cancellation, the aforementioned configuration may have a different technical advantage. The prescribed subframe can be excluded from targets to which power control is applied. In other word, when the first device transmits a DL signal in a UL subframe, it is not necessary for the first device to lower transmit power. In particular, it is able to get out of a constraint that transmit power should be lowered not to cause any interference on other UL transmission in legacy (TDD/FDD) eIMTA. Hence, it may also be able to reduce such a burden as a coverage problem according to the constraint of transmit power, signaling for power control, and the like.

The aforementioned description can be identically/similarly applied to (in-band) full duplex as well.

It may be able to enhance channel estimation performance and detection performance not only by a method of tuning a DL oscillator in accordance with a UL CFO and signaling the tuned oscillator to a DL UE but also by a method for the DL UE to use a CFO.

An eNB detects a DMRS or an SRS of a UL UE or a UL RS of a third party to estimate a CFO and signals the estimated CFO to the UL UE via physical layer signaling or higher layer signaling. The UL UE corrects the oscillator as much as the CFO indicated by the eNB to transmit a UL signal. According to the present scheme, since it is not necessary to perform separate signaling on the DL UE and it is able to forward the CFO to the UL UE, it is able to enhance UL performance and self-interference cancellation performance.

The DL UE can directly measure a CFO of UL and may be able to inform a network of the measured CFO. To this end, the network can signal RS information of the UL UE to the DL UE (and UL UE) via physical layer signaling or higher layer signaling. And, the network can signal a subframe in which an RS is transmitted of the UL UE and a frequency resource position to the DL/UL UE via physical layer signaling or higher layer signaling.

The DL UE may directly measure a CFO of the UL UE and can directly signal the CFO to the UL UE. The UL UE measures the CFO from the DL UE and may be able to signal the CFO to the UL UE via physical layer signaling or higher layer signal using a D2D signal. The UL UE corrects the oscillator of the UL UE using the CFO fed back by the DL UE to transmit a UL signal.

Meanwhile, a CFO measured by a specific DL UE may not be accurate due to mobility of a UE. Hence, a plurality of DL UEs measure a CFO and signal the CFO to a UL UE using a D2D signal and the UL UE performs weighted average or selection using the CFO received from a plurality of the DL UEs to correct the oscillator of the UL UE.

When a plurality of DL UEs estimate a CFO from a specific UE, the information can be signaled to a network. In this case, the network may correct a DL oscillator using the CFO values received from the DL UEs and signal a corrected CFO value to the DL UEs. Or, the network estimates a CFO of the UL UE using CFO values received from a plurality of the DL UEs and signals the UL UE to correct the CFO.

The aforementioned description may operate only when a UL CFO is equal to or greater than a prescribed threshold. For example, if a CFO equal to or greater than a predetermined CFO is detected from a UE, a network or a different UE signals the estimated CFO value to the UE to make the UE correct an oscillator.

If a subcarrier position is different between UL and DL (currently, a gap exists between 7.5 kHz subcarriers on the basis of a DC subcarrier between DL OFDM and UL SC-FDM), a DL signal is transmitted in accordance with a subcarrier of a UL signal and the DL signal can be used for a DL UE to indicate whether or not a subcarrier is moved. In this case, an eNB can forward a signal to the DL UE via physical layer signaling or higher layer signaling to indicate that a subcarrier position has moved as much as 7.5 kHz (on the basis of a DC subcarrier) (or FDR is performed).

Currently, since 7.5 kHz subcarrier shift is applied to an SC-FDM signal on the basis of DC in the center direction, similar to SC-FDM, it may apply half carrier shift on the basis of the DC in the center direction rather than simply apply the half carrier shift to all DL subcarriers in a positive direction or a negative direction. In this case, it may also be able to forward information on whether or not a subcarrier is shifted to the DL UE via physical layer signaling or higher layer signaling. In this case, the eNB may transmit the information in DL using SC-FDM or OFDM to which subcarrier shifting is applied only. A difference between the former and the latter is the presence of DFT spreading.

On the contrary, the UL UE performs puncturing on a DC carrier in accordance with a DL subcarrier and can transmit a UL signal in accordance with a position of the DL subcarrier. In this case, in case of using localized SC-FDM, since single carrier property is broken, PARR can be deteriorated. Hence, when the UL UE operates in FDR, it may use a scheduling restriction scheme that a UL signal is scheduled by avoiding an RB near the DC. Similar to DL, it may use OFDM for UL.

When the UL UE or the DL UE performs an operation of applying a subcarrier shift, the operation may correspond to an operation optionally occurred on a subframe in which FDR is operating only. For example, in case of a subframe operating as DL only or UL only, it may be able to transmit and receive a signal in a subcarrier position similar to a subcarrier position of a legacy LTE scheme.

Meanwhile, although an eNB does not operate in the FDR, if the eNB transmit a signal to a neighboring cell in FDD/TDD (TDD/FDD) eIMTA (or flexible duplex) operating on a UL band or a UL subframe, since a subcarrier position of UL is different from a subcarrier position of DL, complexity may increase in estimating a channel, detecting an interference signal, and cancelling interference. In order to solve the problem, when the eNB operates in the FDR and transmits a signal in a UL band or a UL subframe (i.e., when the eNB transmits a signal in a UL band or a subframe in flexible duplex system), it may transmit a DL signal or a D2D signal at a UL subcarrier position (a subcarrier position which is shifted as much as 7.5 kHz from a legacy DL subcarrier position in a DC subcarrier direction). In this case, in order to reutilize a structure of a DL signal as much as possible, it may maintain RBs and an RS structure of a DL subframe. In particular, unlike SC-FDM, it may be able to utilize RSs and an RB structure of a DL signal without performing DFT spreading while following a subcarrier position of a legacy UL signal.

Meanwhile, regarding resource allocation, when an eNB transmits a signal in an UL band or a subframe, it may use a resource allocation method in legacy DL (discontinuous in frequency domain). When an eNB transmits a signal in an UL band or a subframe, it may use a resource allocation method in UL (In case of a signal cluster transmission, resource are continuously allocated in frequency domain. In case of a multi cluster transmission, resources are continuously allocated in frequency domain according to each cluster and resources are separated in frequency domain between clusters). Or, since it is highly probable that a better amplifier is installed in an eNB compared to a UE, if the eNB performs transmission in a UL subframe or band, it may be able to use a multiple cluster resource allocation scheme all the time.

Meanwhile, as mentioned in the foregoing description, a problem can be solved by signaling a CFO to a UL UE or a DL UE or correcting the CFO. On the other hand, the problem can also be solved by implementing an eNB. For example, if a CFO occurs between DL and UL, it may receive a signal using a clock of DL. In this case, it may be able to preferentially cancel self-interference using the same. Subsequently, it may perform a CFO compensation operation in a time domain signal in consideration of a UL CFO and perform an operation of estimating/detecting a UL signal channel. In this case, it may use such a method as time domain cancellation described in the following to cancel self-interference in the time domain. Or, it may transform a DL RS of legacy frequency domain into time domain in advance.

In order to perform self-interference cancellation, it may introduce time domain cancellation. In this case, time domain channel estimation is required. If a frequency offset occurs between a UL signal and a DL signal, self-interference channel estimation performance can be degraded in time domain due to interference from UL. Hence, it may be able to perform blanking of a UL signal for time domain channel estimation of a DL signal. For example, a first symbol (or a predetermined symbol position) of a subframe corresponds to a symbol in which a DL time domain pilot is transmitted. A UL UE performs blanking in the symbol. In other word, the UL UE does not transmit a signal in the symbol in which the DL time domain pilot is transmitted. The blanking operation can be implemented by rate matching or puncturing. The operation may decrease a data transfer rate of the UL UE. In order to reduce the decrease of the data transfer rate, the UL UE may perform the blanking in all or a part of REs only in which a DL RS is transmitted. Similarly, the blanking can be implemented by rate matching or puncturing. A network can indicate the blanking operation to the UL UE via physical layer signaling or higher layer signaling. Or, the blanking operation can be configured to be performed in a predetermined subframe only. For example, the UL UE does not transmit a signal in all or a part of REs among REs in which a CRS/DMRS/CSI-RS is transmitted. Exceptionally, signal transmission of the UL UE is permitted or whether or not transmission is permitted can be determined by network signaling in an RE in which an RS is transmitted by the UL UE. For example, a blanking exception operation can be applied to an RE or a symbol in which a UL DMRS or an SRS is transmitted.

A time domain pilot (or reference signal) for estimating DL self-interference may reuse an RS of a legacy UL signal or a synchronization signal. For example, it may use a UL DMRS or an SRS. Or, it may use a PSS/SSS. If the RS of the UL signal is reused, it may have a merit in that it is able to reuse a UL receiver circuit. An ID used for generating a sequence can be determined by a cell ID to avoid inter-cell collision. In some cases, a network may configure a seed ID of a time domain RS. In case of reusing a DL RS, it may be able to estimate a time domain channel using a frequency domain RS. In this case, if UL UEs perform a blanking operation, it may be able to increase DL channel estimation performance.

Meanwhile, the proposed scheme can be applied not only to the FDR but also to a legacy cellular system. For example, if a specific UE generates a considerable CFO in legacy cellular UL MU (multiuser) MIMO and the CFO influences on signal detection of a different UE, it may be able to correct the CFO of the specific UE via signaling.

Meanwhile, in the foregoing description, correcting the oscillator may have a meaning that an output frequency value of the oscillator is actually modified. Or, correcting the oscillator may also have a meaning that a signal is transmitted by applying a phase rotation (linearly increasing in every sample) corresponding to a frequency offset in time domain of a baseband signal to the signal. In case of the latter method, since the oscillator has no actual change, an operation of the method can be simplified.

Although the proposed method mainly explains a case that a frequency offset has occurred, if a time offset occurs, the proposed method can be extensively applied to a case of applying offset by DL or UL to reduce the time offset.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 13:
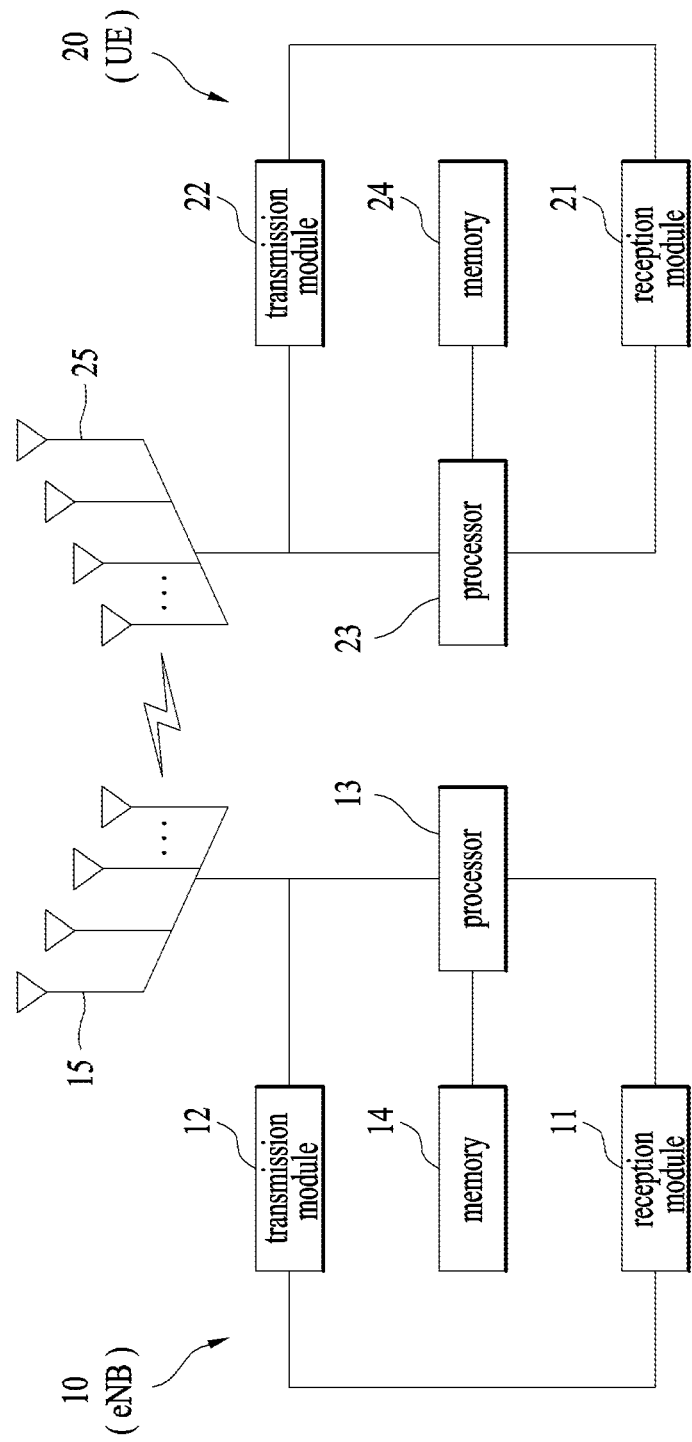
FIG. 13 is a diagram for configurations of a transmitter and a receiver.

FIG. 13 is a diagram for configurations of a transmitter and a receiver.

Referring to FIG. 13, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10. The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 13, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 13 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting and receiving a signal, which is transmitted and received by a first device in a wireless communication system, the method comprising:
transmitting system information indicating subframes for downlink transmission and subframes for uplink transmission; and
transmitting a downlink signal in a specific subframe in which the system information indicates a subframe for the uplink transmission,
wherein the specific subframe is applied to a predetermined time offset determined based on a timing advance applied for the uplink transmission,
wherein the predetermined time offset is a time offset for changing a transmission timing of the specific subframe,
wherein a transmission timing of the downlink signal corresponds to a reception timing of the uplink signal received in the specific subframe through the predetermined time offset, and
wherein the first device transmits, to a second device, information indicating that the predetermined time offset has been applied to the specific subframe.

2. The method of claim 1, wherein a frequency offset and the predetermined time offset are applied at the same time when the specific subframe is transmitted.

3. The method of claim 1, wherein the predetermined time offset corresponds to a value of the timing advance configured when a propagation delay is zero.

4. The method of claim 1, wherein the application of the predetermined time offset is to use a time offset used for uplink transmission.

5. The method of claim 1, wherein the predetermined time offset corresponds to 624 Ts.

6. The method of claim 1, wherein the specific subframe is excluded from targets to which power control is applied.

7. The method of claim 1, wherein the first device corresponds to an evolved Node B (eNB), and
wherein the second device corresponds to a cell adjacent to the first device or a user equipment (UE) belonging to the cell adjacent to the first device.

8. The method of claim 1, wherein the downlink signal is used for cancelling interference to receive an uplink signal of the second device.

9. A first device for transmitting and receiving a signal in a wireless communication system, the first device comprising:
a transmitter and a receiver; and
a processor,
wherein the processor is configured to:
control the transmitter to transmit system information indicating subframes for downlink transmission and subframes for uplink transmission, and
control the transmitter to transmit a downlink signal in a specific subframe in which the system information indicates a subframe for the uplink transmission,
wherein the specific subframe is applied to a predetermined time offset determined based on a timing advance applied for the uplink transmission,
wherein the predetermined time offset is a time offset for changing a transmission timing of the specific subframe,
wherein a transmission timing of the downlink signal corresponds to a reception timing of the uplink signal received in the specific subframe through the predetermined time offset, and
wherein the first device transmits, to a second device, information indicating that the predetermined time offset has been applied to the specific subframe.

10. The first device of claim 9, wherein a frequency offset and the predetermined time offset are applied at the same time when the specific subframe is transmitted.

11. The first device of claim 9, wherein the predetermined time offset corresponds to a value of the timing advance configured when a propagation delay is zero.

12. The first device of claim 9, wherein the application of the predetermined time offset is to use a time offset used for uplink transmission for transmission of the first subframe.

13. The first device of claim 9, wherein the specific subframe is excluded from targets to which power control is applied.

14. The first device of claim 9, wherein the first device corresponds to an evolved Node B (eNB), and
wherein the second device corresponds to a cell adjacent to the first device or a user equipment (UE) belonging to the cell adjacent to the first device.

15. The first device of claim 9, wherein the downlink signal is used for cancelling interference to receive an uplink signal of the second device.

* * * * *